United States Patent [19]
Christiansen et al.

[11] Patent Number: 5,490,191
[45] Date of Patent: Feb. 6, 1996

[54] BWR NUCLEAR FUEL ASSEMBLY

[75] Inventors: David W. Christiansen, Kennewick; John W. Long, Richland, both of Wash.

[73] Assignee: Siemens Power Corporation, Richland, Wash.

[21] Appl. No.: 315,035

[22] Filed: Sep. 29, 1994

[51] Int. Cl.⁶ .................................................. G21C 7/00
[52] U.S. Cl. .......................... 376/434; 376/439; 376/440; 376/352; 376/442; 376/441
[58] Field of Search ...................... 376/439, 440, 376/442, 352, 438, 441, 446, 434; 976/DIG. 188, DIG. 156

[56] References Cited

U.S. PATENT DOCUMENTS

| | | | |
|---|---|---|---|
| 3,015,616 | 2/1962 | Sturtz et al. | 204/193.2 |
| 3,137,638 | 6/1964 | Kumpf et al. | 176/78 |
| 3,607,642 | 11/1968 | Murdock | 376/447 |
| 3,619,367 | 11/1971 | Gumuchian | 376/454 |
| 3,660,231 | 5/1972 | Fox et al. | 376/384 |
| 3,802,995 | 4/1974 | Fritz et al. | 376/435 |
| 4,038,137 | 8/1977 | Pugh | 376/440 |
| 4,152,206 | 5/1979 | Jabsen | 376/462 |
| 4,297,171 | 10/1981 | Olsson | 376/440 |
| 4,344,915 | 8/1982 | Christiansen | 376/437 |
| 4,357,298 | 11/1982 | Wolters, Jr. et al. | 376/441 |
| 4,452,755 | 5/1984 | Hylton | 376/364 |
| 4,587,092 | 5/1986 | Feutrel | 376/438 |
| 4,664,879 | 5/1987 | Blaushild | 376/352 |
| 4,684,501 | 8/1987 | Lui | 376/446 |
| 4,980,121 | 12/1990 | Roberts et al. | 376/439 |
| 5,069,865 | 12/1991 | Yeo et al. | 376/4.51 |
| 5,085,827 | 2/1992 | Johansson et al. | 376/444 |
| 5,327,471 | 7/1994 | Meier et al. | 376/439 |

*Primary Examiner*—Donald P. Walsh
*Assistant Examiner*—Meena Chelliah
*Attorney, Agent, or Firm*—Ira Lee Zebrak

[57] ABSTRACT

A boiling water reactor fuel assembly having a lowered fuel rod support plate and increased fuel rod length while restraining the fuel rods against lateral vibration.

9 Claims, 9 Drawing Sheets

BWR NUCLEAR FUEL ASSEMBLY

FIELD OF THE INVENTION

The present invention relates generally to nuclear fuel assemblies for nuclear reactors, and more particularly to increasing the amount of power generated by the fuel assembly and limiting flow induced vibrations of the fuel rods in the fuel assembly.

BACKGROUND OF THE INVENTION

In a boiling water reactor (BWR), water as the coolant moderator typically enters the fuel assembly from a bottom portion, flows through the fuel assembly, and exits to an uppermost portion. As is typical for nuclear fuel assemblies in BWR's, elongated nuclear fuel rods having end caps at opposite ends are supported at their lower and upper ends between lower and upper tie plates, respectively. The tie plates provide the basic upper and lower structural elements for the fuel assembly in a configuration for interfacing with the reactor core support and for fuel handling. The tie plates also serve to maintain the fuel rod spacing at the ends of the fuel rods. Spacer grids are positioned between the upper and lower tie plates for retaining the fuel rods parallel to one another and with fixed spacing in a fixed geometry. As the coolant moderator flows upward through the fuel assembly, heat is transferred to the coolant moderator.

In order to accommodate the longitudinal (i.e. axial) expansion of the fuel rods during reactor operations, the restraining holes in the lower tie plate which receive the fuel rod end caps are sized so the fuel rod end caps when positioned in their corresponding restraining holes are free to move. Typically, a gap of about 2 to 6 mils exists between the outer wall of the end cap and the wall of the restraining hole. As the coolant moderator enters the fuel assembly and flows into the assembly and by the fuel rods, flow induced vibration at the lower portion of the fuel rods positioned in the restraining holes in the lower tie plate can occur leading to fuel rod fretting wear and subsequent fuel rod failure or premature withdrawal of fuel rods from the reactor.

It is typically desirable to increase the amount of power that can be obtained from a fuel assembly by increasing the reactor coolant flow. However, increasing the reactor coolant flow increases the flow induced vibrations and thus fuel rod fretting. Increased power from a fuel assembly could be obtained if the active length of the fuel rod could be increased which would increase the amount of fuel. However, the active length of a fuel rod is limited by the overall length of the fuel assembly and the required length of the non-fueled lower end cap at the lower end of the fuel rod.

Thus, it would be an advantage over the prior art design if one could obtain more power from a fuel assembly by increasing the length of the active portion of the fuel rod(s) without increasing the length of the fuel assembly and at the same time reduce flow induced vibrations, fuel rod fretting, and subsequent fuel rod failure.

SUMMARY OF THE INVENTION

In accordance with one aspect of the invention, a boiling water reactor nuclear fuel assembly having a predetermined overall length for placement in a nuclear reactor core is provided having an upper tie plate, a lower tie plate comprising a fuel rod support plate adapted to have an aperture for receiving a fuel rod end cap of a nuclear fuel rod and an inlet nozzle into which coolant/moderator enters the fuel assembly, the fuel rod support plate and the inlet nozzle defining a transition zone from the inlet nozzle to the fuel rod support plate for distributing the coolant moderator which enters the inlet nozzle before passing through the fuel rod support plate, said transition zone having a predetermined height. The fuel assembly further having a plurality of spaced apart nuclear fuel rods having an active portion containing fissionable material, at least one of the plurality of nuclear fuel rods having an end cap disposed at a lower end and extending axially outward therefrom for being positioned within the aperture in the fuel rod support plate, wherein the position of the fuel rod support plate is lowered into the transition zone thereby decreasing the height of the transition zone, and the length of at least one of the plurality of nuclear fuel rods is increased by extending the length of the active portion of at least one of the plurality of nuclear fuel rods into the transition zone that had been occupied by the fuel rod support plate.

DETAILED DESCRIPTION OF THE INVENTION

Figure 1:
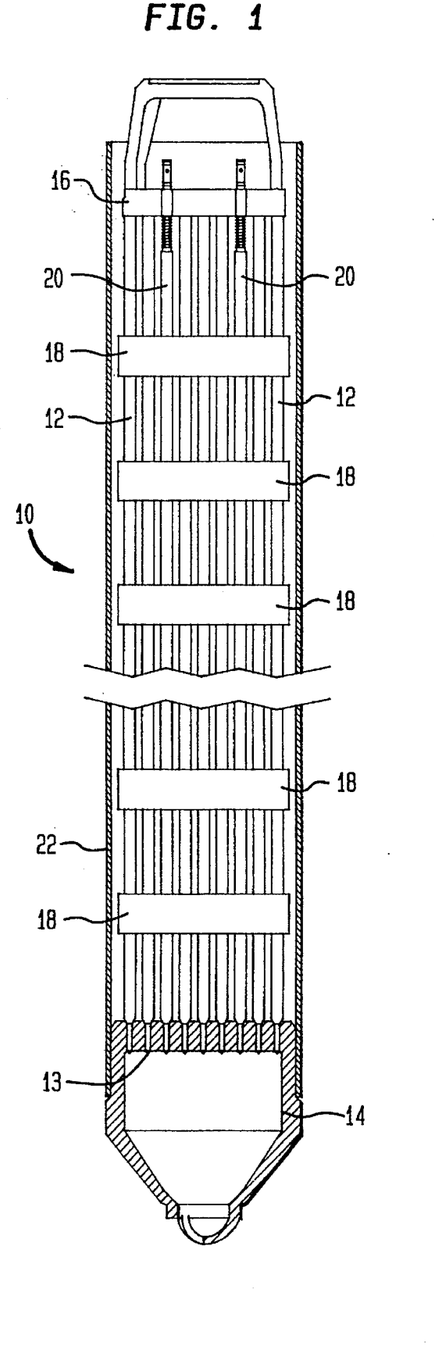
FIG. 1 is a side elevational view, partly in section, of a prior art BWR fuel assembly.

Referring to FIG. 1, a boiling water reactor fuel assembly design typically used in reactors in the U.S. is generally shown at 10 having elongated nuclear fuel rods 12 which are supported between a lower tie plate 14 and upper tie plate 16. Each fuel rod generally includes a zirconium alloy tube within which is nuclear fuel pellets. Lower tie plate 14 and upper tie plate 16 are connected structurally by tie rods 20 positioned within the array of fuel rods. A plurality of spacer grids 18 provide intermediate support of the fuel rods 12 over the length of the fuel assembly and maintain them in spaced relationship while restraining them from lateral vibration. Only five of the spacer grids 18 are shown in FIG. 1 for clarity of illustration. Outer channel 22 completely surrounds the fuel assembly on all four sides and extends from the lower tie plate to the upper tie plate. A boiling water reactor fuel assembly of a design used in reactors outside the U.S. and typically in Europe is generally shown at 30 in FIG. 2 and similarly has fuel rods 32 supported between a lower tie plate 34 and upper tie plate 36, tie rods 40, spacer grids 38, and outer channel 42.

Figure 3:
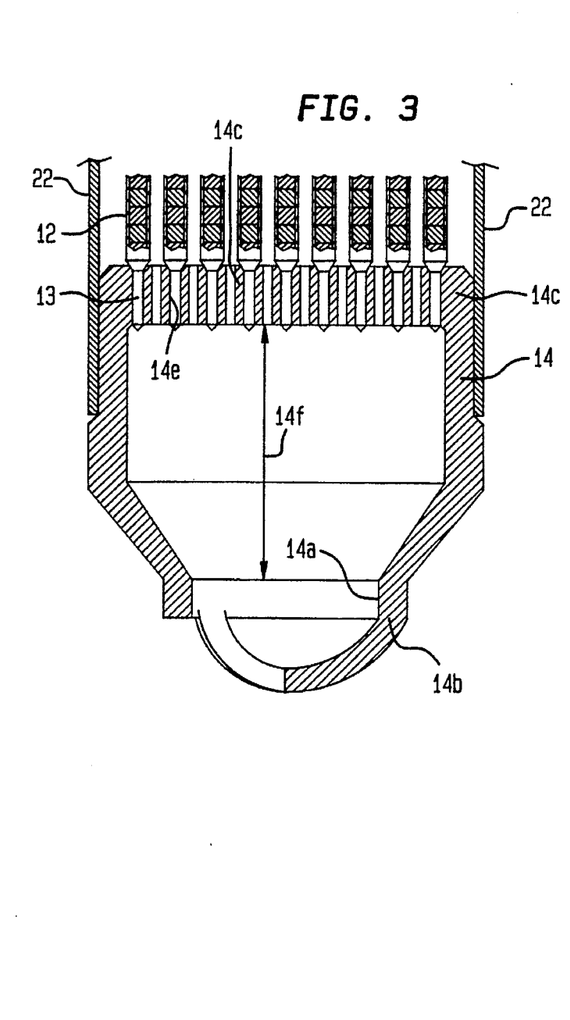
FIG. 3 is an enlarged sectional view of the lowermost portion of the fuel assembly in FIG. 1 showing the lower tie plate.

Referring to FIG. 3 which is an enlarged view of the lowermost portion of fuel assembly 10 shown in FIG. 1, lower tie plate 14 is shown with tie rods removed. Fuel rod end caps 13 are positioned in respective holes 14e of fuel rod support plate 14c. Lower tie plate 14 serves as the interfacing component of the fuel assembly with the lower core support structure (not shown) of the reactor. Lower tie plate 14 is configured to provide a transition zone 14f from the circular coolant inlet 14a in inlet nozzle 14b (which circular inlet matches the discharge of the lower core support) to the square shaped fuel rod support plate 14c. The distance between the bottom of the fuel rods and the bottom of coolant inlet nozzle 14b, i.e. the transition zone 14f, is approximately 5 inches.

Figure 2:
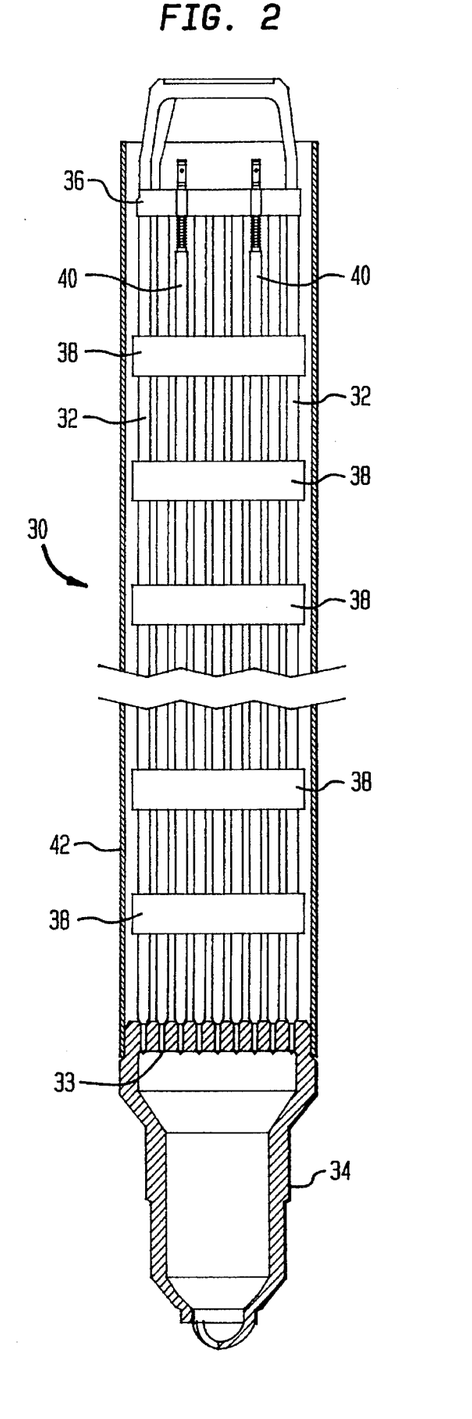
FIG. 2 is a side elevational view, partly in section, of another prior art BWR fuel assembly.
Figure 4:
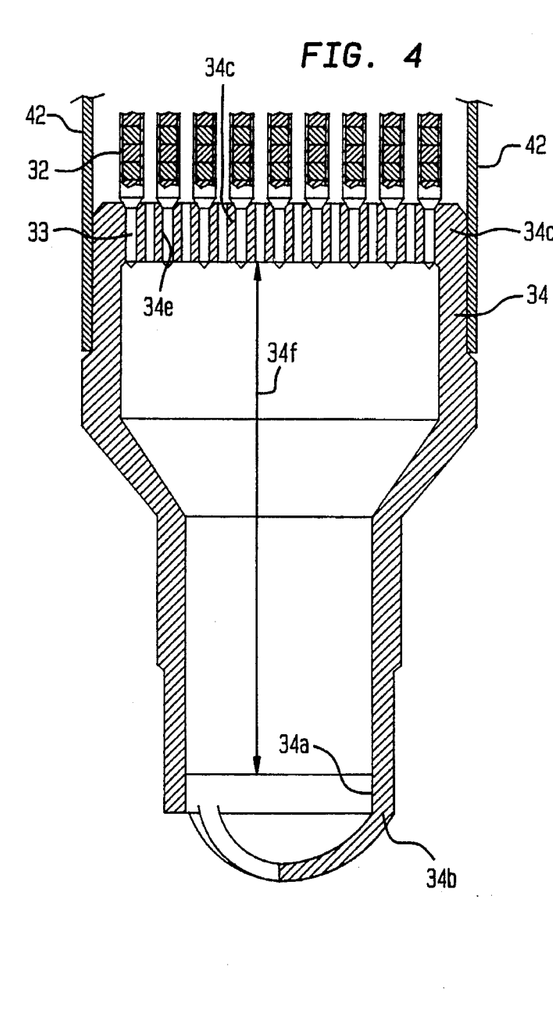
FIG. 4 is an enlarged sectional view of the lowermost portion of the fuel assembly in FIG. 2 showing the lower tie plate.

Referring the FIG. 4 which is an enlarged view of the lowermost portion of fuel assembly 30 shown in FIG. 2, lower tie plate 34 is similarly shown with tie rods removed. Lower tie plate 34 serves as the interfacing component of the fuel assembly with the lower core support of the reactor and includes a generally square fuel rod support plate 34c. Fuel rod end caps 33 are positioned in respective holes 34e of fuel rod support plate 34c. Lower tie plate 34 is configured to provide a transition zone 34f from the circular coolant inlet 34a in inlet nozzle 34b to the square shaped fuel rod support plate 34c. The distance between the bottom of the fuel rods and the bottom of inlet nozzle 34b, i.e. the transition zone 34f, is approximately 8 inches.

As stated above, increased power from the fuel assembly could be obtained if the length of the active portion of the fuel rods could be increased thereby increasing the amount of fuel in each fuel rod. However, since fuel assemblies have a predetermined overall length, the only space above or below the fuel rods to possibly lengthen the fuel rods exists about the upper tie plate and/or about the lower tie plate.

The internal space or transition zone from the inlet nozzle to the fuel rod support plate in which the lower ends of the fuel rods are positioned is open space into which coolant moderator first enters the fuel assembly and then distributes before passing through the fuel rod support plate.

In accordance with the present invention, by lowering the relative position of the fuel rod support plate into the transition zone of the lower tie plate and extending the length of the fuel rods into the space that had been occupied by the transition zone, increased fuel assembly power can be obtained.

However, by decreasing the height of the transition zone, the cross flows created during redistribution of coolant moderator flow immediately downstream of the lower tie plate increases. These cross flows increase the lateral vibration forces on the lower end caps of the fuel rods which, if not controlled, can cause fuel rod failure due to fretting wear.

In accordance with the present invention, the potential for increased lateral vibration resulting from increased cross flows created by the redistribution of coolant flow from lowering the height of the fuel rod support plate of the lower tie plate to increase the length of the fuel rods is eliminated by the use of a spring element in the fuel rod support plate of the lower tie plate. The spring element exerts lateral forces on the fuel rod end cap to overcome the vibratory forces induced by the coolant moderator flow thereby preventing lateral motion and possible fuel rod fretting.

Although flow induced vibration load can be controlled to prevent vibration induced fuel rod wear by the use of a spring which preloads the fuel rod against hardstops in a diametrically open radial spacer grid arrangement, lateral loads induced from differential thermal expansion and irradiation growth could significantly overpower spring loads used to prevent fuel rod vibration induced wear. As a result, reactor fuel rod bow and distortion can occur during fuel assembly irradiation. To interface with the reactor internals, the upper and lower tie plates are required to maintain axial and radial alignment with the fuel rods and the support structure. Since fuel rod distortion must be controlled, devices which are incapable of providing rigid radial restraint of the fuel rods within the lower tie plate are unsuitable.

These problems are overcome in accordance with the present invention by a fuel rod-to-fuel rod support plate small clearance hole that radially interacts with the fuel rod to limit relative distortion therebetween. In this configuration, allowable movement of the fuel rod relative to the tie plate is controlled by the length of engagement of the fuel rod in the hole and the diametrical clearance. Vibration induced wear is then prevented by the application of an internal spring that supplements the rigid lateral restraint.

Figure 5:
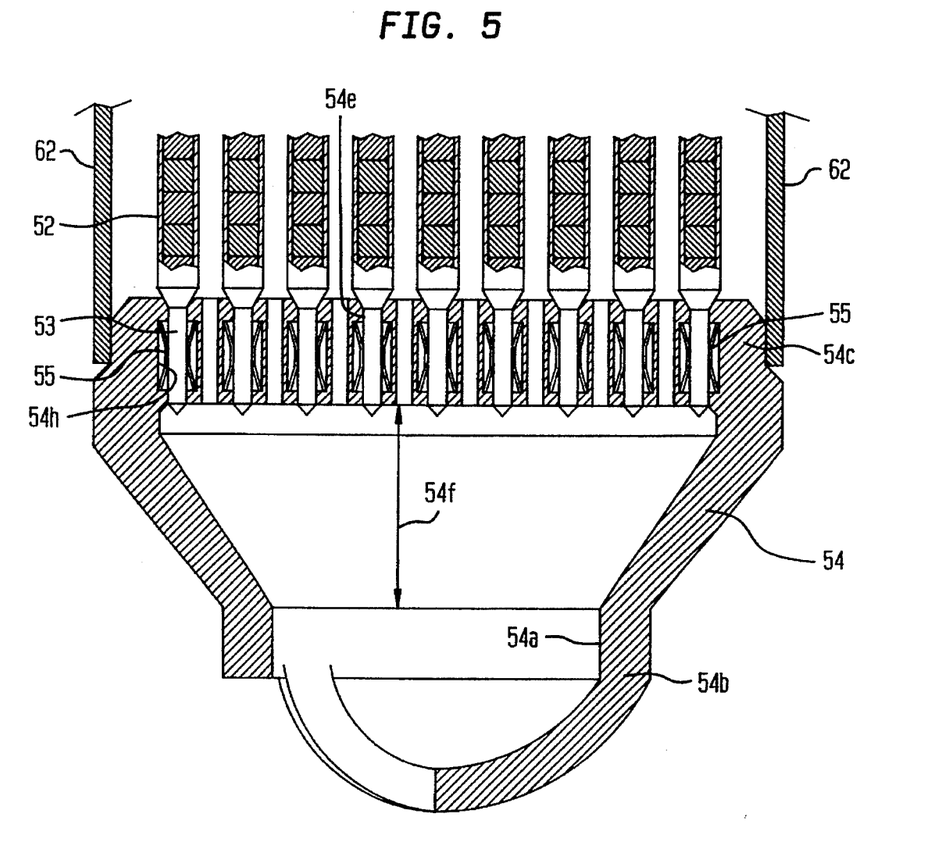
FIG. 5 is a side elevational view, partly in section, of the lower-most portion a BWR fuel assembly in accordance with the present invention.

Referring to FIG. 5, the lower portion of the improved fuel assembly in accordance with the present invention is shown in which the fuel rod support plate has been lowered into the transition zone of the prior art fuel assembly and the active length of the fuel rods have been increased by extending them down to the lowered fuel rod support plate where the end caps of the lengthened fuel rods are restrained laterally by springs. As shown in FIG. 5, lower tie plate 54 has a shortened transition zone 54f above which is positioned fuel rod support plate 54c. Fuel rod end caps 53 of lengthened fuel rods 52 are positioned within holes 54e. Within each hole 54e is a bore 54h which accommodates spring 55 which exerts lateral forces against the fuel rod end cap 53 to restrain the fuel rod and overcome the vibratory forces induced by the coolant moderator flow thereby preventing lateral motion and possible fuel rod fretting.

Figure 9A:
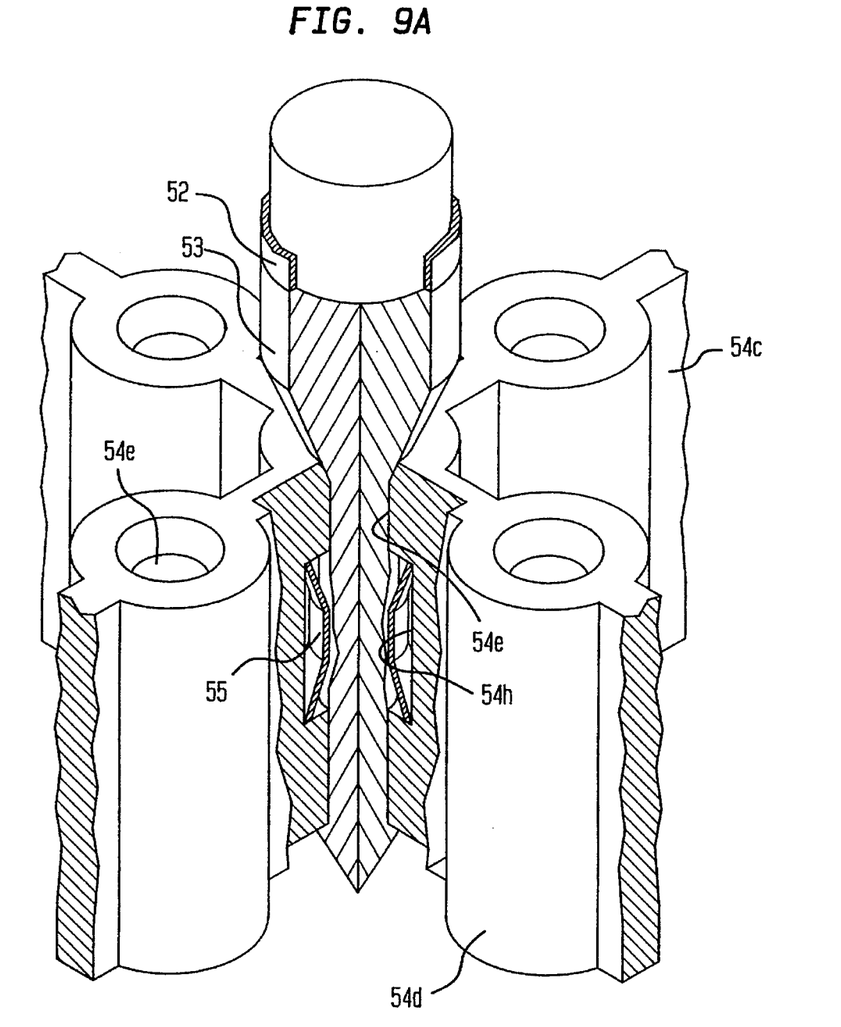
FIG. 9A is a perspective view, partly in section, of a portion of the fuel support plate shown in FIG. 5 in accordance with the present invention.
Figure 9B:
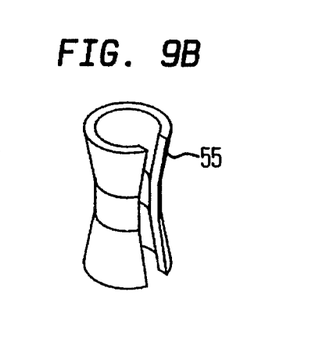
FIG. 9B is a perspective view of the spring shown in FIG. 9A.

Referring to FIG. 9A, a portion of fuel rod support plate 54c is shown broken away with a spring element 55 positioned in bore 54h within hole 54e of shank housing 54d. A perspective view of spring element 55 is shown in FIG. 9B. Spring 55 exerts a lateral force on the outer wall of the fuel rod end cap 53. Although not shown in FIG. 9A for clarity of illustration, all of the other fuel rods of the fuel assembly can similarly be laterally restrained by springs within bores in the support plate.

Figure 6:
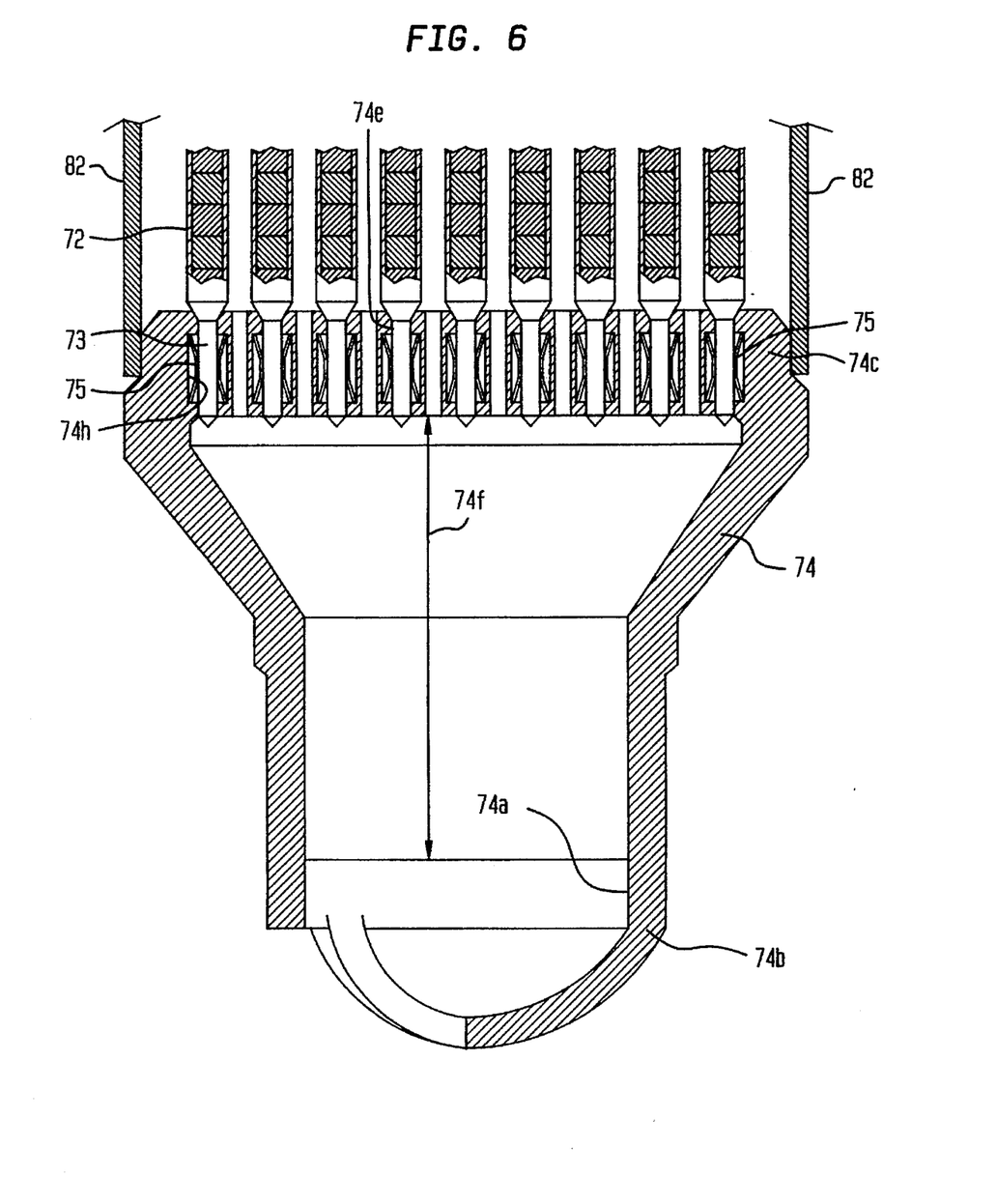
FIG. 6 is a side elevational view, partly in section, of the lower-most portion of another BWR fuel assembly in accordance with the present invention.

The lower portion of the fuel assembly in accordance with the present invention for use in other BWR designs is shown in FIG. 6 in which the fuel rod support plate has similarly been lowered into the transition zone of the prior art fuel assembly shown in FIGS. 2 and 4. The fuel rods have been extended down to the lowered fuel rod support plate and are restrained laterally by springs. Lower tie plate 74 has a shortened transition zone 74f. Fuel rod support plate 74c has a bore 74h within each hole 74e to accommodate springs 75 each of which exerts a lateral force against a fuel rod end cap 73 of a lengthened fuel rod 72.

Figure 7:
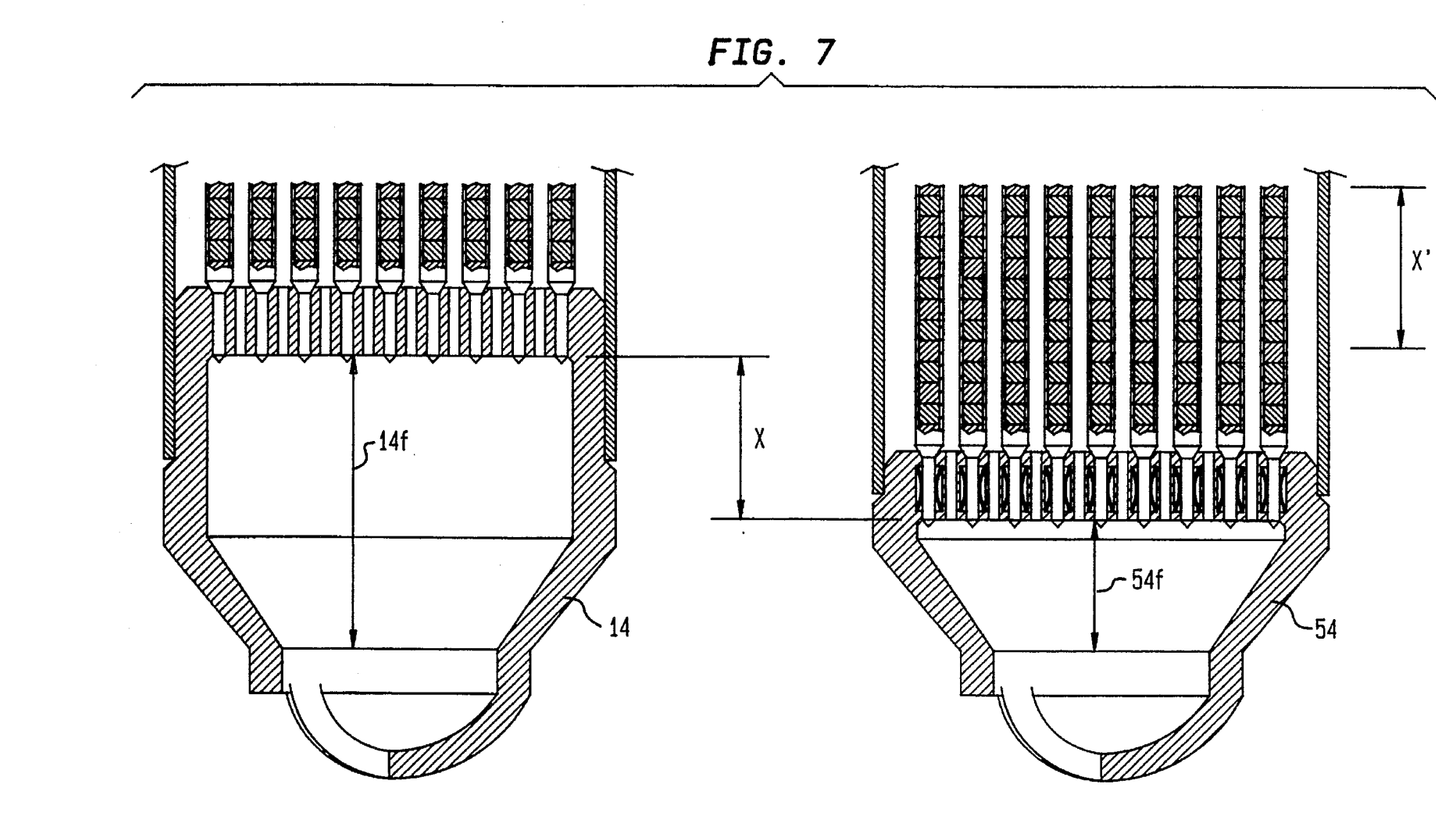
FIG. 7 shows the comparison of the relative height of the transition zone of the prior art fuel assembly shown in FIG. 3 to the transition zone of the fuel assembly shown in FIG. 5 in accordance with the present invention, as well as the increase in fuel rod length of the fuel assembly in accordance with the present invention.
Figure 8:
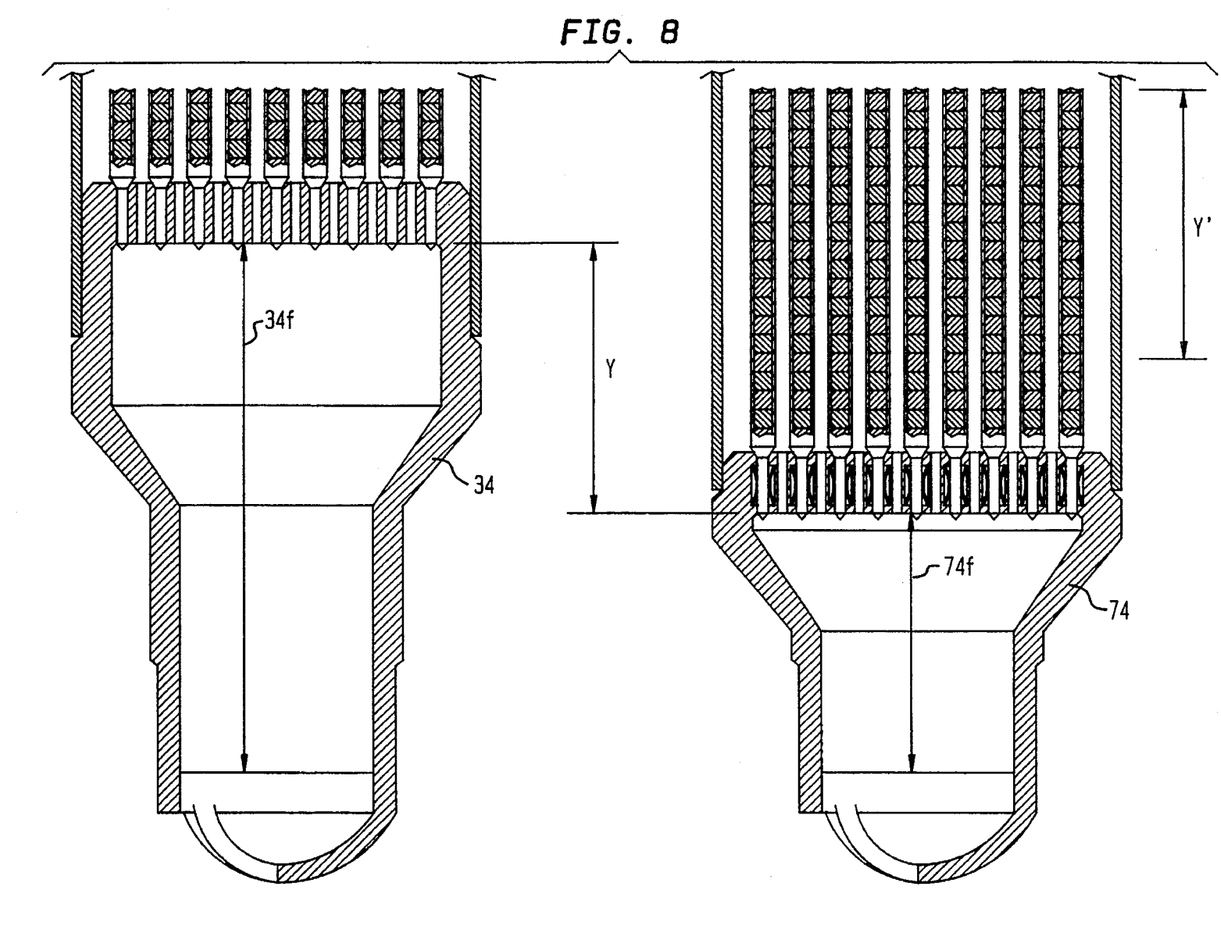
FIG. 8 shows the comparison of the relative height of the transition zone of another prior art fuel assembly shown in FIG. 4 to the transition zone of the fuel assembly shown in FIG. 6 in accordance with the present invention, as well as the increase in fuel rod length of the fuel assembly in accordance with the present invention.

Referring to FIG. 7 which shows the comparison of the relative height of the transition zone of the prior art fuel assembly (FIG. 3) to the transition zone of the fuel assembly shown in FIG. 5 in accordance with the present invention, the distance X that the fuel rod support plate is lowered into the transition zone is equal to the increased length X' of the fuel rods. Similarly, FIG. 8 shows that the distance Y that the fuel rod support plate is lowered into the transition zone of another BWR design (FIG. 4) is equal to the increased length Y' of the fuel rods of the fuel assembly shown in FIG. 6.

Figure 12A:
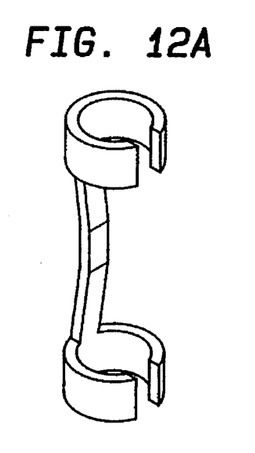
FIGS. 12A, 12B, and 12C are perspective views of alternative embodiments of the internal spring element shown in FIGS. 9A and 9B.
Figure 12B:
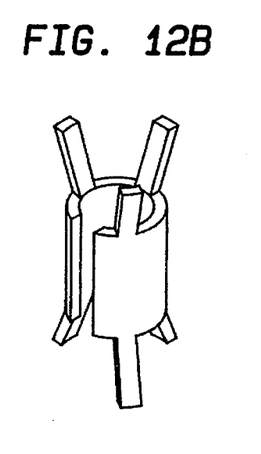
Figure 12C:
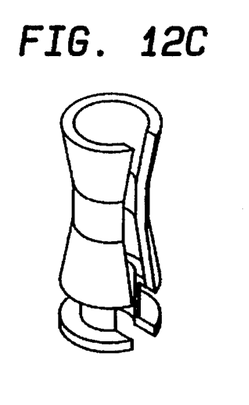

Spring element 55 shown positioned within the modified fuel rod support plate 54c in FIG. 9A is representative of several different variations of springs which can be used to exert a lateral force against the fuel rod end cap to restrain the fuel rod against flow induced vibrations. For example, referring to FIG. 12, a semi-fixed simply supported C-ring (FIG. 12A) is shown, as is a cantilever C-ring (FIG. 12B), and a tubular C-ring (FIG. 12C). Other forms of spring elements such as coil springs or simply supported springs can also be used. Any one of these or equivalent spring elements can be substituted for the one shown in FIG. 9 to provide the lateral force against the fuel rod end cap 53 to support the fuel rod against flow induced vibrations. Each of the spring elements do not increase the pressure drop from the inlet nozzle across the lower tie plate.

Figure 10:
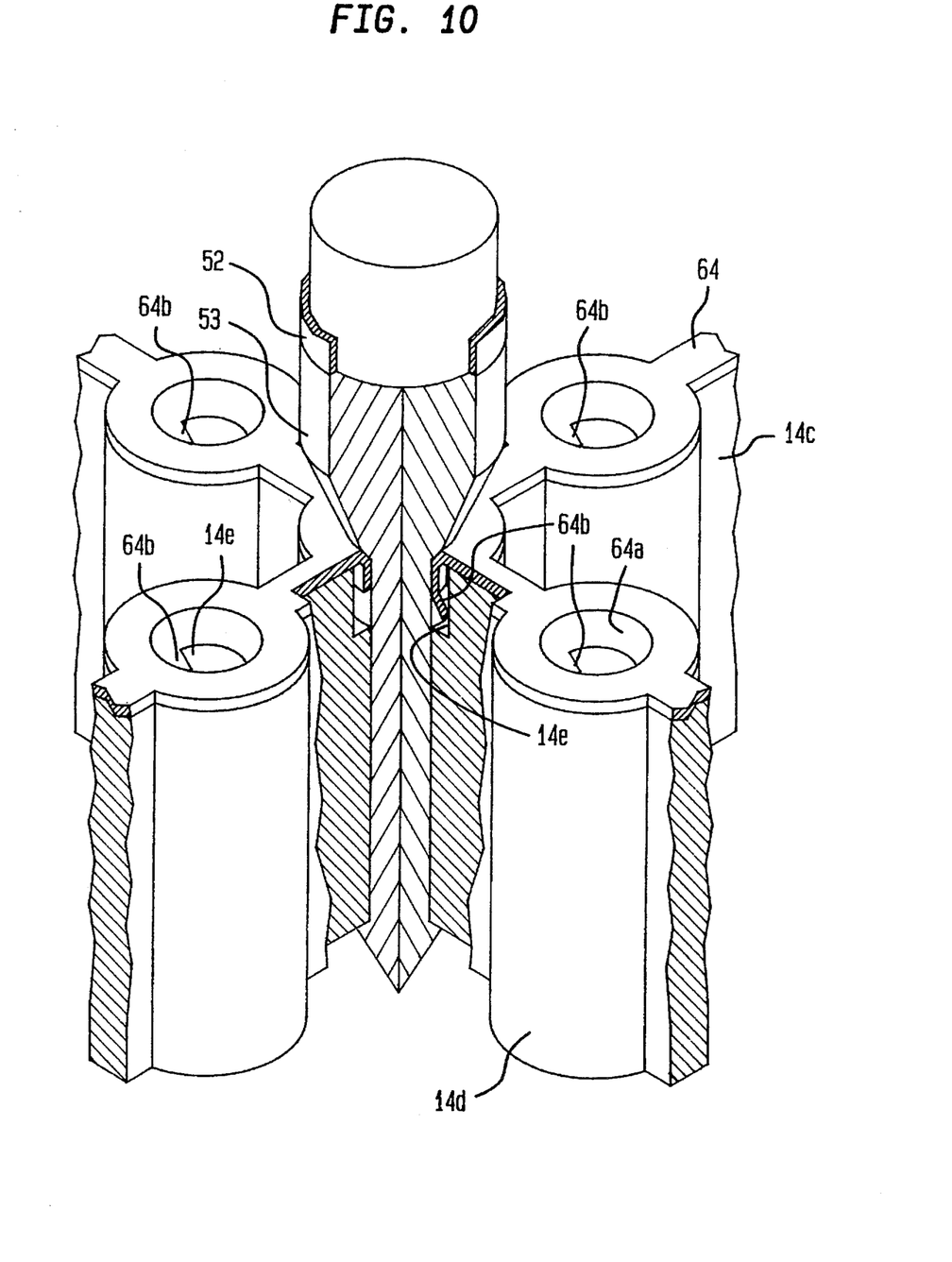
FIG. 10 is a perspective view of an alternative embodiment of the present invention showing a portion of a fuel rod support plate surface adapter positioned atop a fuel rod support plate.
Figure 11:
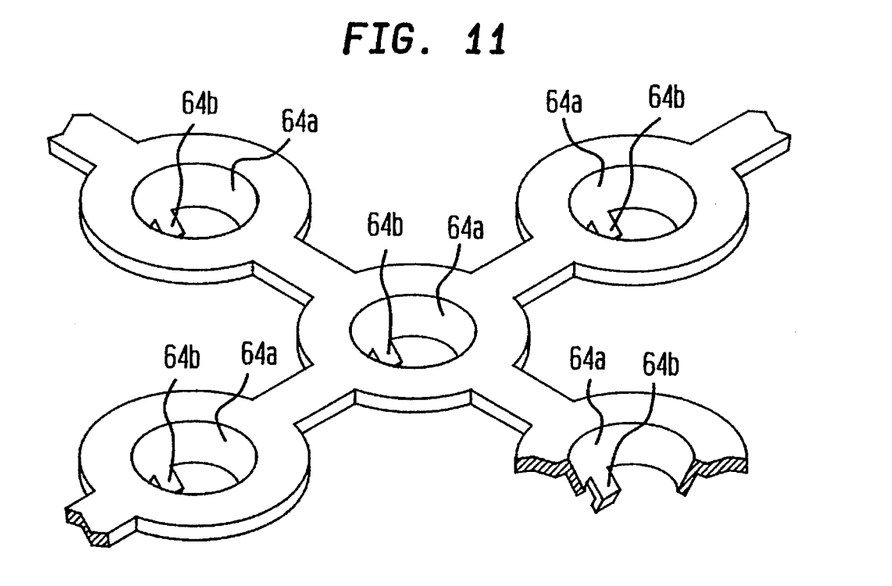
FIG. 11 is a perspective view of the fuel rod support plate surface adapter shown in FIG. 10.

In an alternative embodiment of the present invention, instead of modifying the fuel rod support plate of existing fuel assembly designs to accommodate a spring element within the shank housing, the upper surface of fuel rod support plate 14c is provided with a fuel rod support plate surface adapter 64 which has the same profile as and aligns with fuel rod support plate (See FIGS. 10 and 11.) Surface adapter 64 has fuel rod guides 64a each of which is apertured at its center to allow the fuel rod end cap of the lengthened fuel rod to pass through it and into hole 14e in the fuel rod support plate 14c. Fuel rod guides 64a of surface adapter 64 align with holes 14e in the fuel rod support plate 14c to receive end cap 53 of the extended fuel rod 52. Cantilever springs 64b extend from fuel rod guides 64a and are angled and thereby biased so as to exert a lateral force against end cap 53 of each extended fuel rod to restrain the fuel rods against flow induced vibration and thereby eliminate fretting wear. Each fuel rod guide 64a is at an angle to the surface adapter to form a chamfer for guiding each fuel rod end cap 53 into its respective hole 14e in the fuel rod support plate 14c.

Lowering the height of the fuel rod support plate provides approximately 1 to 4 inches of additional length for the fuel rods. This increase in fuel rod length can be used to increase the power of the fuel assembly, improve reactor, fuel rod and fuel assembly operating margins, or extend fuel rod operating life. These benefits amount to performance improvements of approximately $20 per kilogram of $UO_2$ for an operating nuclear reactor.

In some reactors, an obstacle to increasing power by increasing reactor coolant flow beyond 100% nominal operation is prohibited due to the increased fuel rod vibration and possible fretting due to the increased reactor coolant flow. In accordance with the present invention, the restriction on exceeding the maximum reactor coolant flow rate can be eliminated and a higher reactor coolant flow rate and power can thereby be attained. This increase in power is in addition to the increased power that is obtained by increasing the length of the active portion of the fuel rod.

While the present invention has been particularly shown and described with reference to preferred embodiments thereof, it will be understood by those skilled in the art that various changes in form and details may be made therein without departing from the spirit and scope of the invention.

We claim:

1. A boiling water reactor nuclear fuel assembly having a predetermined overall length for placement in a nuclear reactor core, comprising:

(a) an upper tie plate;
   (b) a lower tie plate comprising:
      (A) a fuel rod support plate adapted to have an aperture for receiving a fuel rod end cap of nuclear fuel rod;
      (B) an inlet nozzle into which coolant/moderator enters the fuel assembly;
   the fuel rod support plate and the inlet nozzle defining a transition zone from the inlet nozzle to the fuel rod support plate for distributing the coolant moderator which enters the inlet nozzle before passing through the fuel rod support plate, said transition zone having a predetermined height;
   (c) a plurality of spaced apart nuclear fuel rods having an active portion containing fissionable material, at least one of the plurality of nuclear fuel rods having an end cap disposed at a lower end and extending axially outward therefrom for being positioned within the aperture in the fuel rod support plate; wherein the position of the fuel rod support plate is lowered into the transition zone thereby decreasing the height of the transition zone, and the length of at least one of the plurality of nuclear fuel rods is increased by extending the length of the active portion of at least one of the plurality of nuclear fuel rods into the transition zone that had been occupied by the fuel rod support plate.

2. The fuel assembly as in claim 1 wherein the fuel rod support plate further includes spring means for contacting and laterally restraining the end cap of the at least one of the nuclear fuel rods by applying lateral forces on the fuel rod end cap to overcome flow induced vibratory forces occurring from increased cross flows created by the redistribution of coolant/moderator flow caused by lowering the height of the fuel rod support plate.

3. The fuel assembly as in claim 2 wherein the spring means is a fuel rod support plate surface adapter positioned on the surface of the fuel rod support plate, the fuel rod support plate surface adapter having at least one apertured fuel rod guide for the fuel rod end cap to pass therethrough and into the aperture in the fuel rod support plate, the apertured fuel rod guide having a cantilever spring for exerting a lateral force against the fuel rod end cap positioned within the aperture in the fuel rod support plate.

4. The fuel assembly as in claim 2 wherein the fuel rod support plate is further adapted to have a bore within said aperture said bore having a dimension larger than the aperture, and the spring means is a spring member positioned within the bore.

5. The fuel assembly as in claim 4 wherein at least one of the springs is a semi-fixed simply supported C-ring.

6. The fuel assembly as in claim 4 wherein at least one of the springs is a cantilever C-ring.

7. The fuel assembly as in claim 4 wherein at least one of the springs is a tubular C-ring.

8. The fuel assembly as in claim 4 wherein at least one of the springs is a coil spring.

9. The fuel assembly as in claim 4 wherein at least one spring is simply supported spring.

* * * * *